(12) United States Patent
Alajajyan et al.

(10) Patent No.: US 7,278,599 B2
(45) Date of Patent: Oct. 9, 2007

(54) DOUBLE DISC BRAKE FOR BRAKE PADS OF FISHING REEL

(76) Inventors: Harout Alajajyan, 22448 S. Summit Ridge Cir., Chatsworth, CA (US) 91311; Sarkis Alajajyan, 22438 S. Summit Ridge Cir., Chatsworth, CA (US) 91311

( * ) Notice: Subject to any disclaimer, the term of this patent is extended or adjusted under 35 U.S.C. 154(b) by 0 days.

(21) Appl. No.: 11/050,608

(22) Filed: Feb. 2, 2005

(65) Prior Publication Data
US 2005/0173576 A1  Aug. 11, 2005

Related U.S. Application Data

(60) Provisional application No. 60/543,751, filed on Feb. 10, 2004.

(51) Int. Cl.
*A01K 89/02* (2006.01)
(52) U.S. Cl. .......................... 242/303; 242/304; 242/291
(58) Field of Classification Search ................ 242/290, 242/291, 302, 303, 304
See application file for complete search history.

(56) References Cited

U.S. PATENT DOCUMENTS

| | | | | |
|---|---|---|---|---|
| 3,315,913 A | * | 4/1967 | Grieten | 242/271 |
| 4,742,974 A | * | 5/1988 | Furomoto | 242/271 |
| 4,867,392 A | * | 9/1989 | Sato | 242/255 |
| 5,297,756 A | * | 3/1994 | Ikuta | 242/270 |
| 5,318,246 A | * | 6/1994 | Ikuta | 242/303 |
| 5,454,526 A | * | 10/1995 | Kaneko | 242/255 |
| 5,988,547 A | * | 11/1999 | Koelewyn | 242/246 |
| 6,053,446 A | * | 4/2000 | Henze et al. | 242/321 |
| 6,102,316 A | * | 8/2000 | Nilsen | 242/255 |
| 6,164,576 A | * | 12/2000 | Takahashi | 242/271 |
| 6,254,020 B1 | * | 7/2001 | Nilsen | 242/255 |
| 6,805,313 B2 | * | 10/2004 | Nilsen | 242/303 |
| 6,827,306 B1 | * | 12/2004 | Datcuk, Jr. | 242/303 |

FOREIGN PATENT DOCUMENTS

JP  04349837 A  * 12/1992

* cited by examiner

*Primary Examiner*—Gene O. Crawford
*Assistant Examiner*—Evan H. Langdon
(74) *Attorney, Agent, or Firm*—William W. Haefliger

(57) ABSTRACT

A double disc brake for a fishing reel, comprising in combination a fishing reel assembly having a pin axle, acting as a stop and/or drive, two rotatable discs carried by the pin to rotate therewith, as fishing line is wound or payed out, said discs located proximate opposite ends of the reel, brake pads at opposite ends of the reel to be engaged as the discs and pads are relatively closed into engagement, at said opposite ends of the reel.

7 Claims, 4 Drawing Sheets

DOUBLE DISC BRAKE FOR BRAKE PADS OF FISHING REEL

This application is based on and takes priority from provisional application Ser. No. 60/543,751, filed Feb. 10, 2004.

BACKGROUND OF THE INVENTION

This invention relates to fishing reel braking systems, and more particularly to a compact fishing reel with a double disc brake system containing four brake pads, two on each side of the spool, to make operation of the drag system smoother, and to provide more drag pressure for big-game fishing.

Objects include provision of a double disc brake for a fishing reel comprising:
 a) a fishing reel assembly having an axle,
 b) two rotatable discs carried by the axle to rotate therewith, as fishing line is wound or payed out, the discs located proximate opposite ends of the reel, and
 c) brake pads at opposite ends of the reel to be engaged as the discs and pads are relatively closed into engagement, at such opposite ends of the reel.

As will be seen, means is provided for effecting disc and pad engagement at one end of the reel, prior to disc and pad engagement at the opposite end of the reel, in response to movement of novel brake actuator structure.

DRAWING DESCRIPTION

GENERAL ORGANIZATION

Figure 1:
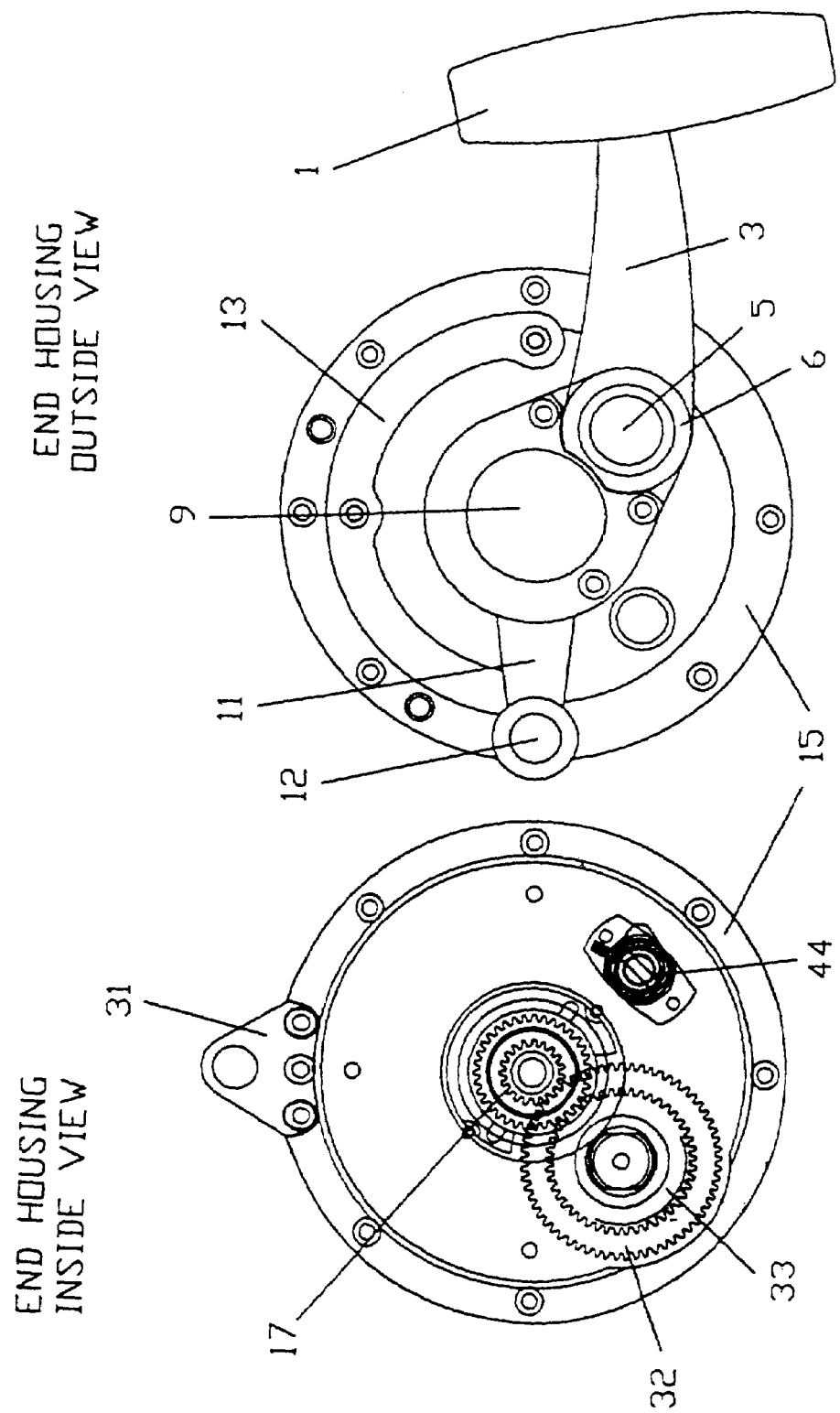
FIG. 1 shows end housing inside and outside views.

Cup-shaped end housings 15 and 29 are connected to opposite ends of a cylindrical body 30. That body carries a rotary spool 25, having end flanges. Two axially spaced disc brakes 20a and 20b are carried by the end flanges, and are co-axial. See axis 100, and pins 21.

The spool or reel is rotatable on bearings 24 carried by a shaft 27, defining an axis 100. Brake pads, in the form of non-rotary discs 19a and 19b are located at opposite sides of 20a; and brake pads, in the form of non-rotary discs 19c and 19d are located at opposite sides of 20b these elements being coaxial.

A helical right hand spring 23a effects engagement and release of right brake pads 19a and 19b, with respect to disc 20a, and a helical left hand spring 23b effects engagement and release of left brake pads 19a and 19d with respect to disc 20b. Spring 23a extends about the shaft and is endwise located between drive pins 22a and 22b. Spring 23b extends about the shaft and is located between drive pins 22c and 22d. Pins 22a - - - 22d extend through the shaft and couple to the brake discs as shown. The springs and drive pins are so located as to achieve differential release of the left and right sets of brake pads and discs, as referred to below. Belleville washers 18 exert leftward force at 22a.

Operation

In order to create free spool 25 spinning with minimum brake retraction and eliminating any unwanted contact between brake pads 19 and brake discs 20, while drag pressure is released to free spool position, the shaft right spring 23a which has stronger coils than the shaft left spring 23b, retracts first and releases right brake pads 19a, 19b with predetermined distance from right brake disk 20a, which is achieved by location of drive pin 22b, and then release of the shaft left 23b spring to a predetermined distance to clear contact between left brake pads 19c, 19d and brake disc 20b.

At this position the force of the shaft left spring 23b keeps the spool 25, brake pads 19 and brake disks 20 at fixed relative positions and ensures clearance between them and a reliable free spinning spool.

The shaft is axially movable relative to the housing under the control of mechanism 75, to effect the above differential braking function.

Figure 2:
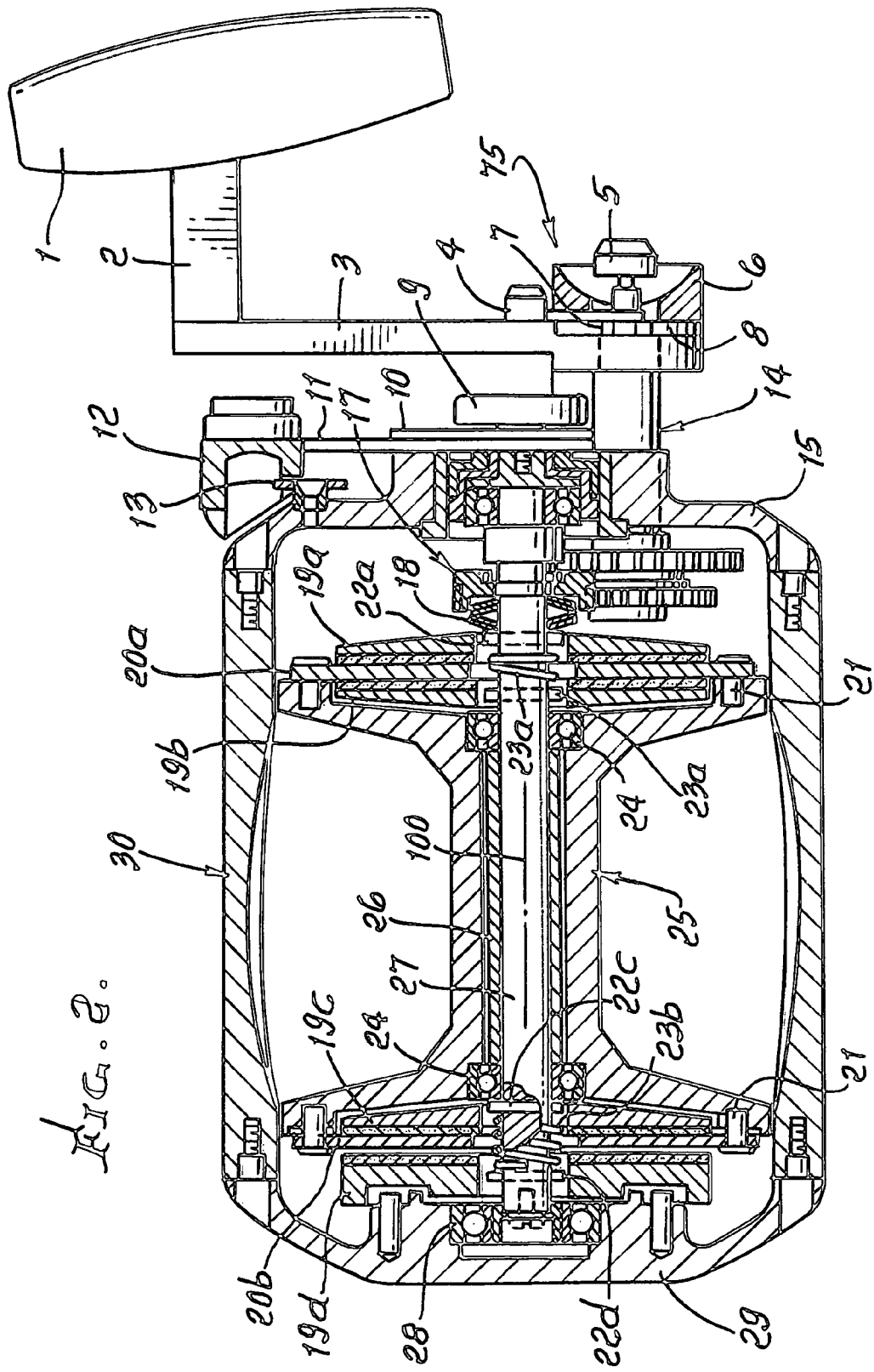
FIG. 2 is a section in elevation through a preferred reel.
Figure 3:
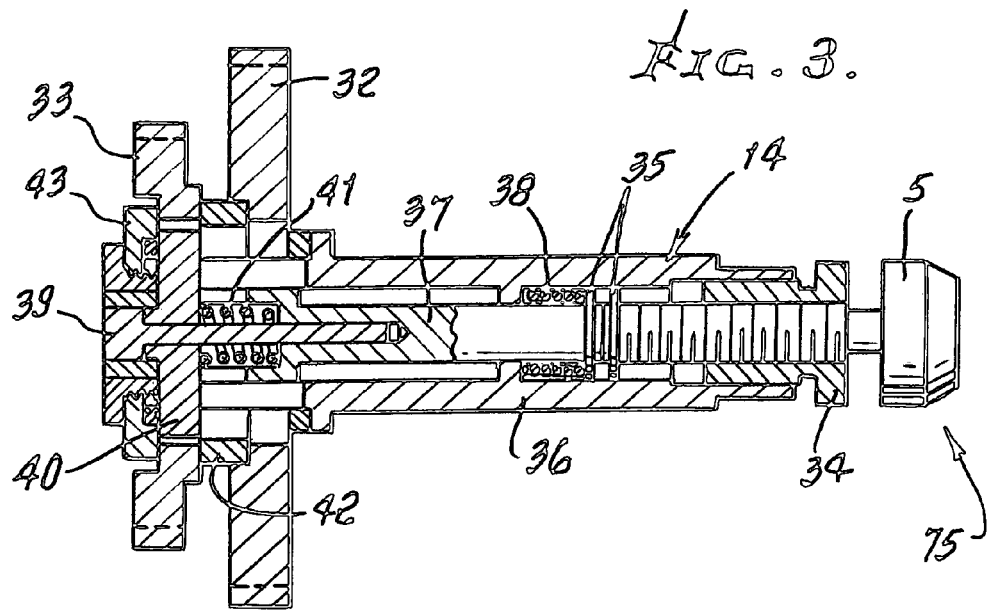
FIGS. 3-5 are sections taken through a two speed drive shaft assembly in low, neutral, and high speed configurations.
Figure 4:
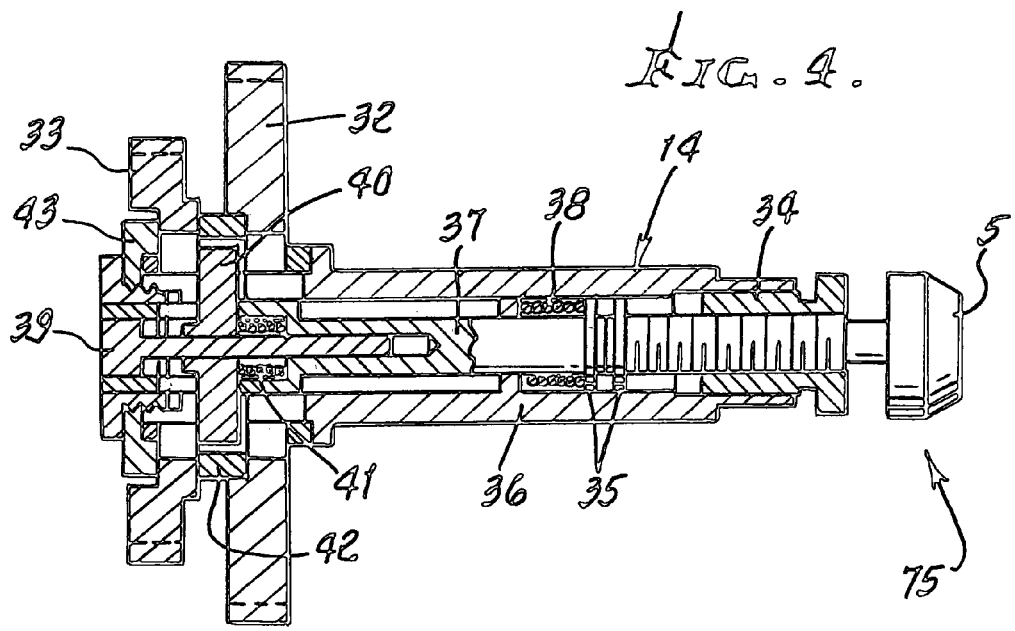

As seen in FIGS. 2 and 3, by locking a speed change push pin 5 in low speed position, shifter 37 moves to the left and compresses the shifter release spring 38 and locking pin spring 41. The spring 41 forces gear locking pin 40 to neutral position until it engages with one of the low speed gear 33 slots.

Figure 5:
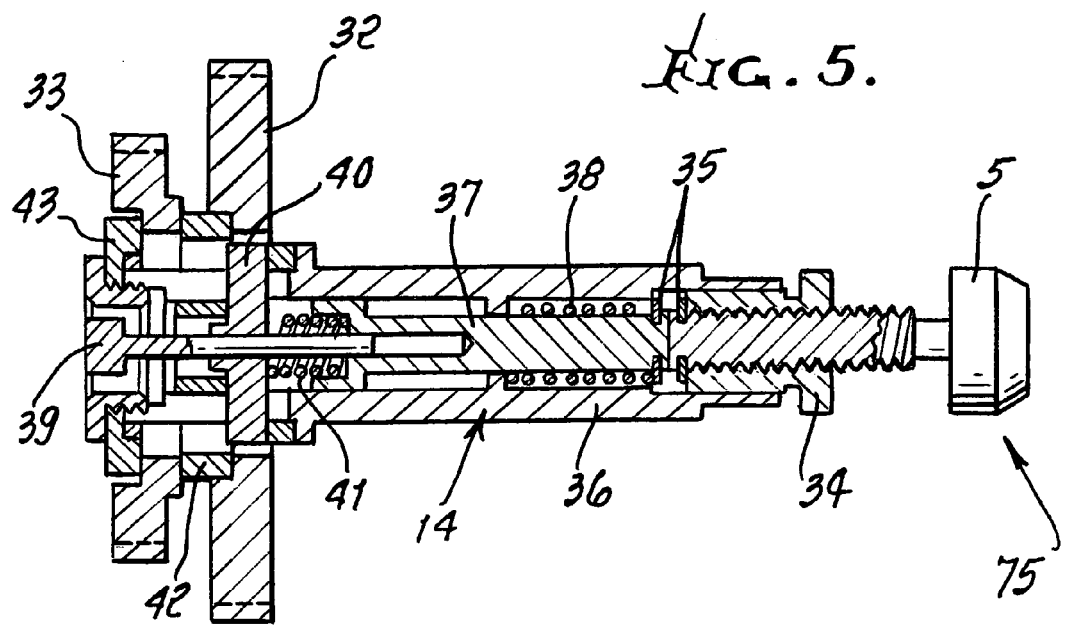

After releasing the speed change push pin 5 the shifter release spring 38 returns the shifter to the right, to high speed position, and disengages gear locking pin 40 from low speed gear 33 to neutral position until gear locking pin 40 engages with one of high speed gear 32 slots. See the TABLE below, and FIG. 5. Accordingly, pin 5 controls shifting between high and low speed gears 32 and 33, which control reel rotation speed. Shifter center pin 39 is provided to guide shifter 37, and to center gear locking pin 40.

Components of the complete preferred assembly are listed in the TABLE below:

TABLE

| # | DESCRIPTION |
|---|---|
| 1 | HANDLE GRIP |
| 2 | HANDLE ARM |
| 3 | CRANK ARM |
| 4 | PUSH PIN RELEASE ARM |
| 5 | SPEED CHANGE PUSH PIN |
| 6 | CRANK ARM COVER |
| 7 | CRANK ARM NUT |
| 8 | CRANK ARM LOCK PLATE |
| 9 | DRAG PRESET KNOB |
| 10 | COVER PLATE |
| 11 | DRAG ARM |
| 12 | DRAG LEVER KNOB |
| 13 | DRAG KNOB GLIDE PLATE |
| 14 | 2 SPEED DRIVE SHAFT ASSEMBLY |
| 15 | END HOUSING |
| 16 | DRIVE SHAFT BALL BEARING |
| 17 | PINION GEAR |
| 18 | BELLEVILLE WASHERS |
| 19 | BRAKE PADS (a, b, c, d) |
| 20 | TITANIUM DISC BRAKES (a, b) |
| 21 | BRAKE DISK PINS |
| 22 | DRIVE PIN (a, b, c, d) |
| 23 | SHAFT SPRING (a, b) |
| 24 | SPOOL BEARINGS |
| 25 | SPOOL |
| 26 | SPOOL SPACER TUBING |
| 27 | SPOOL SHAFT |
| 28 | END CUP HOUSING BEARING |
| 29 | END CUP HOUSING |
| 30 | BODY |
| 31 | HARNESS LUGS |
| 32 | DRIVE SHAFT LARGE GEAR |
| 33 | DRIVE SHAFT SMALL GEAR |
| 34 | PIN NUT |
| 35 | PIN E CLIP |
| 36 | DRIVE SHAFT |
| 37 | SHIFTER |

TABLE-continued

| # | DESCRIPTION |
|---|---|
| 38 | SHIFTER RELEASE SPRING |
| 39 | SHIFTER CENTER NUT |
| 40 | GEAR LOCKING PIN |
| 41 | LOCKING PIN SPRING |
| 42 | GEAR SPACER |
| 43 | SPACER WASHER |
| 44 | CLICKER ASSEMBLY |

As shown in the drawings, pins 22a-d can move axially, relative to the brake pads.

As the assembly including the spool, is pushed to the left, in FIG. 2, as by force exertion via the shaft (transmitted through 18, to disc 20a), toward fixed pad 19d, the pad 19c is pushed to the left by the spool, and the brake disc 20b is engaged by its pads to establish braking (initial) at the left disc 20b.

Thereafter, since the spool is now axially stopped, the leftward moving pad 19a now pushes disc 20a against the pad 19b to establish braking at the right end of the assembly, i.e. two-stage braking.

Pins 22a-d operate to transmit rotary drive from the shaft to the pads.

The springs assist, via the pads, to release the braking on the pads, as the shaft retracts to the right.

We claim:

1. A double disc brake for a fishing reel, comprising in combination
   a) a fishing reel assembly having an axle,
   b) two rotatable discs carried by the axle to rotate therewith, as fishing line is wound or payed out, said discs located proximate opposite ends of the reel,
   c) brake pads at and spaced from opposite ends of the reel with two pads at opposite sides respectively of each disc to be engaged with said opposite sides of each disc as the discs and pads are relatively closed into engagement, at said opposite ends of the reel,
   d) and including means for effecting disc and pad engagement at one end of the reel, prior to disc and pad engagement at the opposite end of the reel, in response to movement of a brake actuator, said means including springs for biasing said discs in an axial direction or directions generally parallel to the direction of disc and pad relative closing,
   e) and wherein the spring or springs biasing one disc has or have a greater spring rate or rates than the spring or springs biasing the other disc.

2. The combination of claim 1 wherein said two pads at opposite sides of one disc, and said two pads at opposite sides of the other disc, are spaced from said discs to allow disc rotation, all of said pads having peripheries with substantially the same overall radial dimensions.

3. The combination of claim 2 wherein the reel assembly defines a fishing line spool carried to rotate with said two discs, and to extend beyond the peripheries of the pads.

4. The combination of claim 1 including means carrying the two discs which are coaxial, to be disengaged by the brake pads, in response to operation of an actuator.

5. The combination of claim 1 wherein said means includes shaft associated mechanism to effect differential movement of said springs in response to shaft associated positioning.

6. The combination of claim 1 wherein there are two of said springs, which extend about the shaft, one of said springs keeping the reel, brake pads, and brake discs at axial positions of pad and disc disengagement, ensuring free spinning of the reel.

7. The combination of claim 5 including a speed change push pin controlling shifter positioning between associated high and low speed positions.

* * * * *